United States Patent [19]
Susnjara

[11] Patent Number: 5,979,519
[45] Date of Patent: Nov. 9, 1999

[54] MACHINE TOOL HAVING IMPROVED MEANS FOR HOLDING WORKPIECES

[75] Inventor: Kenneth J Susnjara, Birdseye, Ind.

[73] Assignee: Thermwood Corporation, Dale, Ind.

[21] Appl. No.: 09/123,836

[22] Filed: Jul. 28, 1998

[51] Int. Cl.[6] .............................. B23H 1/00; B23B 7/04; B23C 9/00
[52] U.S. Cl. ........................ 144/48.1; 83/422; 83/452; 144/135.2; 144/286.5; 269/21; 409/189; 409/197; 409/219
[58] Field of Search ........................ 29/56.5, 558, 563; 83/422, 451, 457, 708; 144/24.02, 24.05, 48.1, 135.2, 286.1, 286.5, 1.1, 2.1; 269/21, 303; 409/137, 189, 192, 219, 225, 226, 334, 903

[56] References Cited

U.S. PATENT DOCUMENTS

| | | | |
|---|---|---|---|
| 4,949,942 | 8/1990 | Shoda | 269/21 |
| 5,323,821 | 6/1994 | Suzuki | 144/48.1 |
| 5,375,951 | 12/1994 | Veale | 144/24.05 |
| 5,493,767 | 2/1996 | Susnjara | 144/135.2 |
| 5,524,328 | 6/1996 | Hardesty | 144/250.14 |
| 5,547,003 | 8/1996 | Susnjara et al. | 144/24.02 |

*Primary Examiner*—W. Donald Bray
*Attorney, Agent, or Firm*—Lalos & Keegan

[57] ABSTRACT

A machine tool having a base unit, a table mounted on the base unit, at least one workpiece support member mounted on the table having a work support surface disposed at an angle to the horizontal, devices for removeably securing a workpiece on the work support surface and a tool operatively engageable with a workpiece secured on the workpiece support surface for performing a work function thereon.

37 Claims, 3 Drawing Sheets

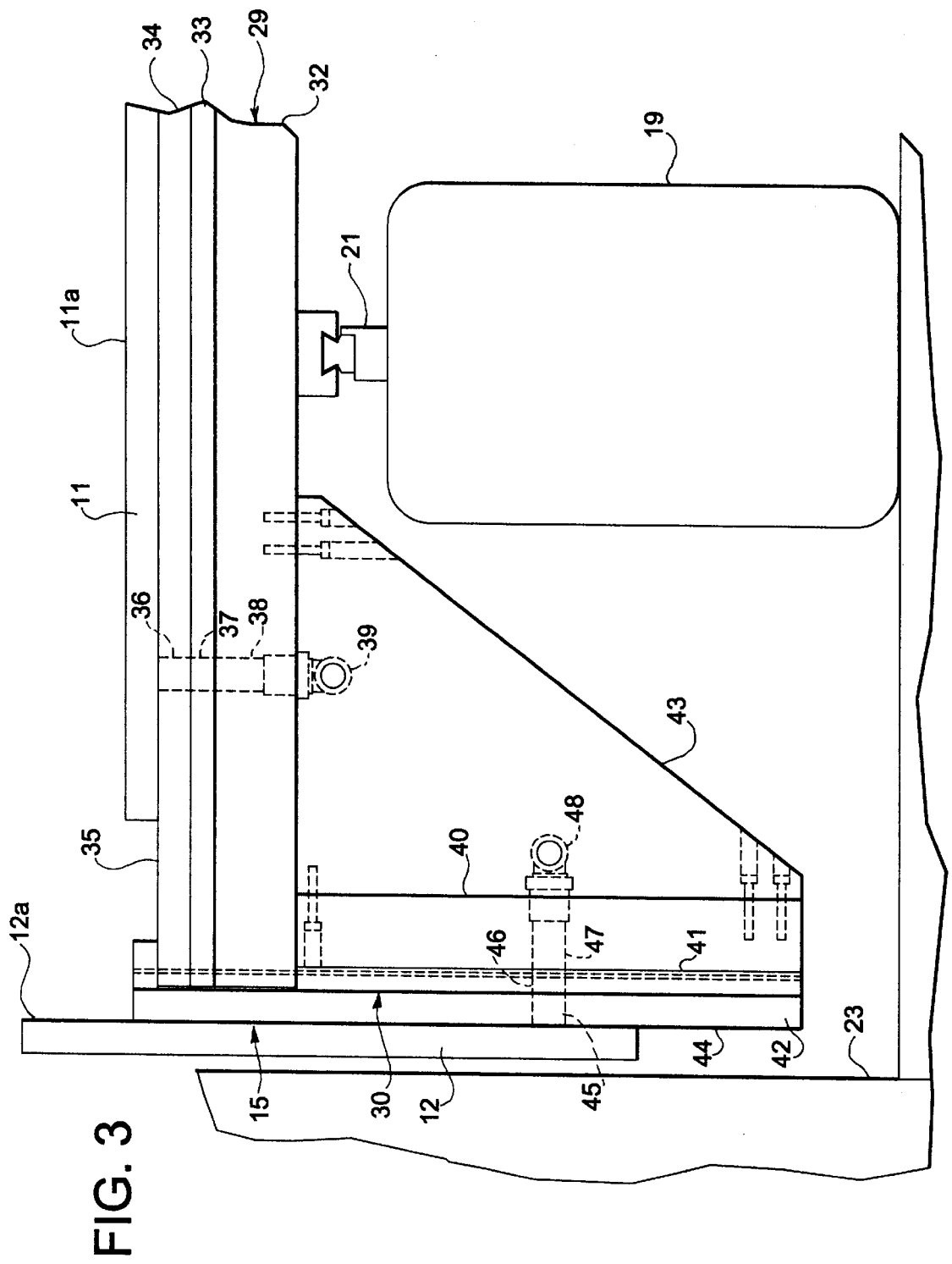

MACHINE TOOL HAVING IMPROVED MEANS FOR HOLDING WORKPIECES

This invention relates to machine tools and more particularly to a machine tool having improved means for holding workpieces.

BACKGROUND OF THE INVENTION

Computer numerical controlled machine tools such as routers used in the woodworking, plastics and nonferrous metal industries, typically consist of a base unit, a stationary or moveable workpiece support table mounted on the base unit, a stationary or moveable gantry mounted on or adjacent to the base unit, and a toolhead assembly mounted on a transversely disposed bridge member of the gantry. Either the table or the gantry is displaceable relative to the base unit longitudinally or along an x-axis, the toolhead assembly is displaceable transversely or along a y-axis and a tool is displaceable vertically or along a z-axis. The table or gantry, the toolhead assembly and the tool are displaced along their respective axes by feedscrews driven by servomotors. The motions of the various components of the machine are controlled by a controller which operates the various servomotors of the machine according to instructions of a program inputted into the machine.

Workpieces to be machined are positioned on the table of the machine and located in predetermined locations by the use of pop-up pins provided on the table or other means, and are held down by various means including clamps and vacuum systems. Vacuum systems may consist of conventional systems which are suitable for large production runs, and universal systems which are more suitable for short production runs. A conventional vacuum system generally includes a vacuum port provided in the workpiece support table, connected to a vacuum pump, and a vacuum fixture positioned on the workpiece support table about the vacuum port on which the workpiece is positioned. The fixture is provided with a peripheral rubber seal engaged by the workpiece positioned thereon, which permits the evacuation of air between the fixture and the workpiece to hold the workpiece in place. A universal vacuum system generally includes a table having a lower rigid plate, an intermediate plate having a recessed upper surface arranged in a grid pattern, an upper spoilboard formed of a porous material such as particleboard, closing the recess grid pattern in the intermediate board to form a plenum and a vacuum pump operatively connected to the plenum. As a vacuum is applied to the plenum, air is drawn through the particleboard to produce a low pressure zone on the surface of the particleboard, which functions to hold a workpiece positioned on the particleboard.

In machines of the type described, the workpiece support surface is normally horizontal and the axis of rotation of the tool is vertical. Consequently, machining operations on a workpiece positioned on the table of the machine normally can be performed only on a single face of the workpiece. To perform machine operations on additional faces of the workpiece, a separate toolhead having a different, dedicated angle of rotation of the tool, a separate pivotable toolhead or an adapter for a toolhead which displaces the angle of rotation of the tool must be made available, or the workpiece must be reoriented on the table to present a different face to be machined. The requirement of additional tools obviously is disadvantageous because of increased capital expense, and the requirement of a tool change or a reorientation of the workpiece along with attendant fixturing also is disadvantageous because of an increase in machine cycle times resulting in increased production costs. The use of additional toolheads or adapters has the additional disadvantage of having limitations in terms of positioning the tool bit close to the workpiece support surface without the table interfering with the toolhead assembly, as when drilling a horizontal hole in a side edge of a workpiece of shallow depth, and risking crashing the toolhead onto the table. Also, the orientation of workpieces on the table has the additional disadvantage of a limitation of the height of an elongated workpiece positioned on an end thereof due to the upper limit of travel of the tool. Accordingly, it is the principal object of the present invention to provide a machine tool of the type described which is readily capable of machining different faces of a workpiece without the requirement of additional or special toolheads or adapters for conventional toolheads, or any extensive or unworkable orientation of the workpieces.

SUMMARY OF THE INVENTION

The present invention obviates the aforementioned disadvantages of prior art machines and methods of machining workpieces by providing a machine tool generally consisting of a base unit, a table mounted on the base unit, at least one workpiece support member mounted on the table, having a work support surface disposed at an angle to the horizontal, means for removeably securing a workpiece on the work support surface, and a tool operatively engageable with a workpiece secured to the support surface for performing a work function. Preferably, the table is stationary and the tool is displaceable along orthogonal x, y and z axes or the table is moveable along an x-axis and the tool is displaceable along orthogonal y and z axes, and the workpiece support member depends from a lateral side of the table with the work support surface disposed in a vertical plane to accommodate elongated workpieces with end faces thereof disposed above the surface of the table for engagement by the machining tool. In a further preferred embodiment of the machine, the table is provided with a work support surface lying in a horizontal plane and a pair of work support surfaces lying in transversely spaced vertical planes, and a vacuum system is provided for removeably securing workpieces on such surfaces.

BRIEF DESCRIPTION OF THE DRAWINGS

FIG. 3 is an enlarged view of the section designated in FIG. 2, further illustrating a set of workpieces positioned on the work table of the machine.

DESCRIPTION OF THE PREFERRED EMBODIMENT OF THE INVENTION

Figure 1:
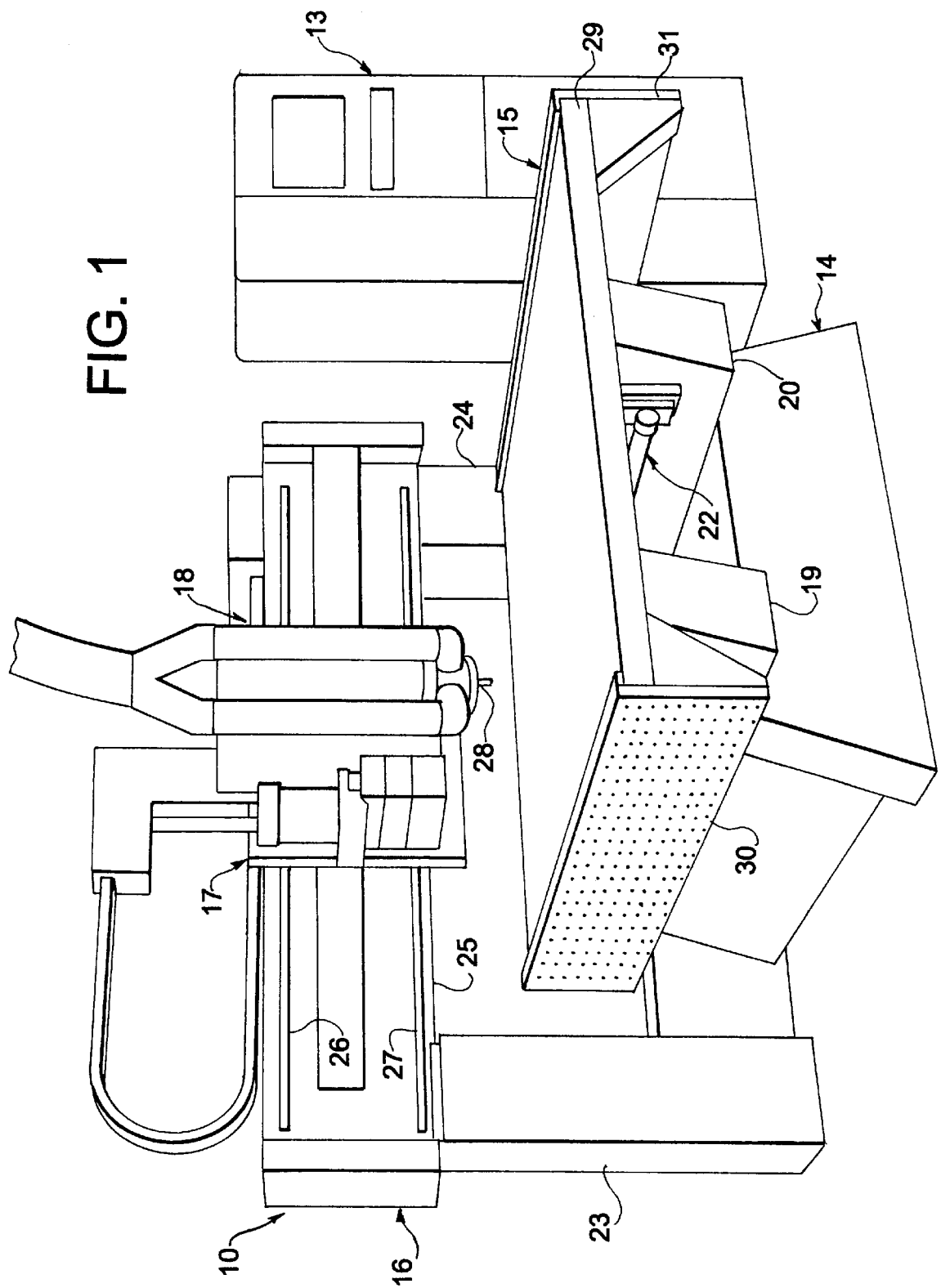
FIG. 1 is a perspective view of a CNC machine tool embodying the present invention and a controller for the machine.

Referring to the drawings there is illustrated a computer numerical control machine 10 operative to perform various machine functions on one or more workpieces 11 and 12 positioned on the machine, and a controller 13 operatively connected to the machine for controlling its motions pursuant to a program inputted into the controller. The machine includes a base unit 14, a moveable workpiece support table 15, a stationary gantry 16, a toolhead support assembly 17 and a toolhead 18. The base unit includes a pair of longitudinally disposed, transversely spaced beam members 19 and 20 on which there is supported a pair of longitudinally disposed, transversely spaced guideways 21,21. Workpiece support table 15 is mounted on guideways 21,21 and is adapted to be displaced longitudinally or along an x-axis by means of a feedscrew assembly 22 driven by a servomotor operated by the controller. Gantry 16 includes a pair of leg sections 23 and 24 disposed adjacent the base unit and spaced apart sufficiently to permit the workpiece support table to be displaced therebetween along the x-axis, and a transversely disposed bridge section 25 rigidly secured to the upper ends of the leg sections and spanning the distance therebetween above the workpiece support table. The front face of the bridge section is provided with a pair transversely disposed, vertically spaced guideways 26 and 27 on which there is supported toolhead support assembly 17 for displacement transversely or along a y-axis. The toolhead support assembly is displaced along the y-axis by a feedscrew driven by a servomotor operated by the controller. Toolhead assembly 18 is mounted on a pair of transversely spaced, vertically disposed guideways on the toolhead support assembly and is adapted to be displaced vertically or along a z-axis. The toolhead assembly also is displaced relative to the toolhead support assembly by means of a feedscrew assembly driven by a servomotor operated by the controller. A tool bit 28 in the form of a drill or router is removeably mounted on the lower end of the toolhead assembly which may be positioned in contact with a workpiece mounted on the workpiece support table to perform a variety of machining operations. By displacing the table along the x-axis and displacing the toolhead assembly along the y and z-axes responsive to command signals of the controller, the tool bit will be positioned in contact with a workpiece to perform the machining operations.

Workpiece support table 15 consist of a horizontally disposed section 29 supported on guideways 21,21 for displacement along the x-axis, and a pair of transversely spaced, vertically disposed sections 30 and 31 depending from the lateral sides and rigidly secured to horizontal section 29. Horizontal section 29 includes a lower, rectangularly configured plate member 32, an intermediate, rectangularly configured plate member 33 and an upper, rectangularly configured board member 34 commonly referred to as a spoilboard. Plate member 32 is formed of a rigid material, either a composite or a metal such aluminum, and is supported on guideways 21,21. Upper plate member 34 is provided with workpiece support surface 35 upon which a workpiece 11 maybe positioned and is formed of a material which would not damage a tool unintentionally coming into contact therewith and may be machined periodically to provide a flat surface upon which workpieces may be positioned. Upper board member 34 also is provided with a plurality of ports 36 communicating through aligned openings 37 and 38 in plate members 33 and 32 with a fixture 39 connected to a vacuum pump system. With workpiece 11 positioned on support surface 35 overlying port 36, and the vacuum pump system operating, a vacuum is applied to 36 to cause workpiece 11 to be firmly secured on support surface 35 for engagement by the tool bit of the machine. Alternatively, intermediate plate member 33 may be provided with a removed portion in the interior thereof communicating with a passageway 38, the upper board member would cooperate with the lower and intermediate plate members to provide a plenum communicating with passageway 38 and the upper plate member would be formed of a porous material such as particleboard so that a vacuum applied to passageway 38 will draw air through the porous board member to cause a workpiece 11 positioned on surface 35 to be firmly positioned thereon.

Vertical table section 30 similarly includes an inner plate member 40 an intermediate plate member 41 and an outer board member 42. Inner plate member 40 is rigidly secured to horizontal table section 29, depends from the underside of plate member 32 and extends the entire length of plate member 32 along the x-axis. It is formed of a rigid material similar to plate member 32, consisting of a composite or a metal such as aluminum. It is braced by a set of longitudinally spaced bracket members 43 welded or otherwise secured by bolts to the underside of plate member 32 and the inner sides of plate member 40. Intermediate plate member 41 and outer board member 42 are firmly secured to inner plate member 40 by means of a set of bolts. Outer board member 42 is provided with a vertical workpiece support surface 44 on which a workpiece 12 may be mounted in a vertical orientation. Board member 42 further is provided with a port 45 communicating through passageways 46 and 47 with a fixture 48 similar to fixture 39 which is connected to the vacuum pump system of the machine. When a vacuum is applied to port 45, a workpiece 12 mounted on support surface 44 overlying port 45 will be caused to be firmly positioned and held on support surface 44 as shown in FIG. 3. Alternatively, intermediate plate member 41 may be provided with a removed portion in the interior thereof communicating with passageway 47, outer board member 42 may be formed of a porous material that would cooperate with the intermediate and inner plate members to form a plenum communicating with passageway 47 and a vacuum applied to such a plenum would cause air to be drawn through the pores of the outer board member to cause a workpiece 12 positioned on support surface 44 to be firmly held thereon.

Table section 31 is constructed similarly to table section 30 and also may be constructed with a plurality of ports in the workpiece support surface as in a conventional vacuum system or a porous board member with a plenum connected to a vacuum pump system as in a universal vacuum system.

Figure 2:
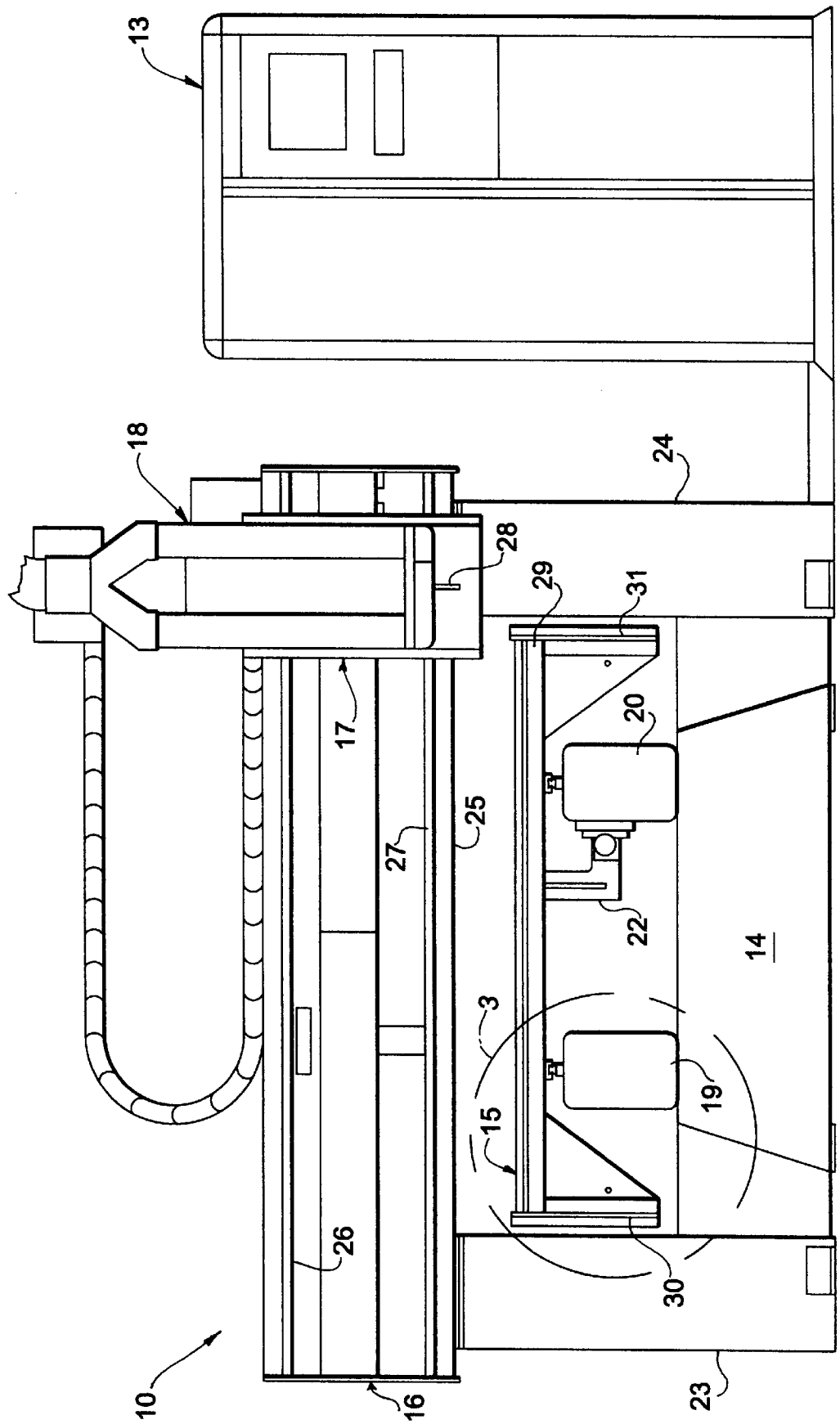
FIG. 2 is a front elevational view of the machine and controller shown in FIG. 1.

As best illustrated in FIG. 2, the transverse dimension of table 15 is less than the transverse spacing between leg sections 23 and 24 of the gantry to permit the mounting of vertically orientated workpieces on the outer workpiece support surfaces of vertical table sections 30 and 31 of the table, and further permit the table to freely displace along the x-axis. Bridge 25 of the gantry and/or the uppermost position of the lower end of toolhead 18 is disposed sufficiently above workpiece support surface 35 of the table to permit workpieces 12 mounted on the vertical sections of the table to extend above workpiece support surface 35 so that the toolhead assembly may be freely positioned relative to such vertically oriented workpieces to machine the end faces thereof such as in drilling a hole in the narrow end faces thereof or routing slots in the end portions thereof.

In the use of the machine as described to machine a broad face of a workpiece having a long length, a fairly broad width and an end face having shallow depth, with the machine being suitably progammed, the workpiece may be positioned on horizontally disposed workpiece support surface 35 of the table with the side face of the workpiece facing upwardly as with workpiece 11 shown in FIG. 11 so that the tool bit of the machine may be guided alongside face 11*a* of the workpiece to perform the desired machining operation thereon. The workpiece may then be repositioned on vertically disposed workpiece support surface 44 with its narrow end face facing upperwardly as with workpiece 12 shown in FIG. 3 to permit machining operations on end face 12*a* of workpiece 12. An example of a specific use of the machine would be the machining of a face panel of drawer used in a piece of furniture such as a bureau or a dresser. With the machine suitably programmed and an appropriate router bit installed on the toolhead, a blank of wood stock would first be placed on workpiece support surface 35 in the position of workpiece 11, the vacuum system would be activated to firmly hold the piece and then the machine would be operated by the controller to rout a desired configuration on face portion 11a of the workpiece. When the routing operation has been completed, the tool may be changed to a drill and the machine may be operated to drill holes in workpiece 11 to accommodate bolt for pull handles to be installed on the panel. Once the machining operations on face 11a of the workpiece have been completed, the vacuum system is turned off to free the workpiece in the position of workpiece 11, and the workpiece may then be positioned on vertical workpiece support surface 44 as shown in FIG. 3 to position end face 12a horizontally above the upper surface of table section 29. A suitable router may then be inserted in the toolhead assembly and the machine operated to rout dovetail configured slots in the end of the vertically disposed workpiece. The workpiece may then be inverted to rout dovetail slots in the opposite end of the workpiece.

By providing both horizontal and vertical workpiece support surfaces on the table, a single toolhead assembly provided with a spindle having a dedicated vertical axis of rotation along with different tool bits may be utilized to perform various machining operations on multiple faces of a single workpiece. Furthermore, by providing vertical workpiece support surfaces on the side of the table and allowing sufficient spacing between the upper surface of the table and the uppermost position of the lower end of the toolhead, workpieces of substantial lengths may be accommodated for machining the end faces thereof. In addition, no special toolhead assemblies or adapters are required to perform machining functions on workpieces having shallow depths and there is no danger of a toolhead assembly having to travel so close to the table so as to risk a crashing of the toolhead.

Machines with the type of table as described may be used with conventional or universal vacuum systems for removeably securing the workpieces on the workpiece support surfaces of the table.

From the foregoing detailed description it will be evident that there are a number of changes, adaptations, an modifications for the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A machine tool comprising:
a base unit;
a table mounted on said unit;
at least one workpiece support member mounted on said table, having a work support surface disposed at an angle to the horizontal;
means for removeably securing a workpiece on said work support surface; and
a tool operatively engageable with a workpiece secured on said support surface for performing a work function thereof.

2. A machine tool according to claim 1 wherein said table is stationary and said tool is moveable.

3. A machine tool according to claim 2 wherein said tool is displaceable along orthogonal x, y and z-axes.

4. A machine tool according to claim 1 wherein said table is moveable.

5. A machine tool according to claim 4 wherein said table is displaceable along an x-axis and said tool is displaceable along orthogonal y and z-axes.

6. A machine tool according to claim 1 including a bridge member having a pair of support leg sections disposed astride said base unit and a transverse section spanning the upper ends of said support leg sections, spaced from said table.

7. A machine tool according to claim 6 wherein said table is stationary, said bridge is displaceable along an x-axis, said tool is mounted on said transverse section of said bridge member and is displaceable along orthogonal y and z-axes.

8. A machine tool according to claim 6 wherein said bridge member is stationary, said table is displaceable along an x-axis and said tool is mounted on said transverse section of said bridge member and displaceable along orthogonal y and z-axes.

9. A machine tool according to claim 6 wherein said work support surface is disposed between said support leg sections of said bridge member.

10. A machine tool according to claim 1 wherein said means for removeably securing a workpiece on said work support surface comprises a vacuum system.

11. A machine tool according to claim 10 wherein said workpiece support surface includes at least one port and said vacuum system includes a vacuum pump operatively connected to said port.

12. A machine tool according to claim 10 wherein said workpiece support member comprises a member formed of a porous material and said vacuum system includes a vacuum pump operatively connected to said porous member.

13. A machine tool according to claim 1 wherein said workpiece support member depends from said table.

14. A machine tool according to claim 1 wherein said work support surface lies in a substantially vertical plane.

15. A machine tool according to claim 1 wherein said table includes a first workpiece support member having a first work support surface disposed substantially horizontally and at least a second workpiece support member having a second workpiece support surface disposed substantially vertically.

16. A machine tool according to claim 15 including means for removeably securing workpieces on said workpiece support surfaces comprising a vacuum system.

17. A machine tool according to claim 16 wherein each of said workpiece support surfaces includes at least one port and said vacuum system includes a vacuum pump operatively connected to said ports.

18. A machine tool according to claim 16 wherein said workpiece support members comprise members formed of a porous material and said vacuum system includes a vacuum pump operatively connected to said porous members.

19. A machine tool according to claim 15 wherein said second workpiece support member depends from a lateral side of said first workpiece support member.

20. A machine tool according to claim 1 including a first workpiece support member having a first workpiece support surface disposed substantially horizontally, a second workpiece support member having a second workpiece support surface disposed substantially vertically, depending from a lateral side of said first workpiece support member, and a third workpiece support member having a third workpiece support surface disposed substantially vertically, depending from a lateral side of said first workpiece support member.

21. A machine tool according to claim 20 wherein each of said workpiece support surfaces includes at least one port, and said removeably securing means includes a vacuum system operatively connected to said ports.

22. A machine tool according to claim 20 wherein each of said workpiece support members is formed of a porous material, and said removeably securing means includes a vacuum system operatively connected to said workpiece support members.

23. A workpiece support assembly for a machine tool having a base unit and a tool operatively engageable with a workpiece for performing a work function thereon comprising:
   a table mountable on said base member,
   at least one workpiece support member mounted on said table, having a workpicce support surface disposed at an angle to the horizontal; and
   means for removeably securing a workpiece on said work support surface.

24. A workpiece support assembly according to claim 23 wherein said table is rigidly mountable on said base unit.

25. A workpiece assembly according to claim 23 wherein said table is mountable on said base unit for displacement along a given line of travel.

26. A workpiece support assembly according to claim 23 wherein said means for removeably securing a workpiece on said workpiece support surface comprises a vacuum system.

27. A workpiece support assembly according to claim 26 wherein said workpiece support surface includes at least one port and said vacuum system includes a vacuum pump operatively connected to said port.

28. A workpiece support assembly according to claim 26 wherein said workpiece support member comprises a member formed of a porous material and said vacuum system includes a vacuum pump operatively connected to said porous member.

29. A workpiece support assembly according to claim 23 wherein said workpiece support member depends from said table.

30. A workpiece support assembly according to claim 23 wherein said work support surface lies in a substantially vertically plane.

31. A workpiece support assembly according to claim 23 including a first workpiece member having a first workpiece support surface disposed substantially horizontally and at least a second workpiece support member having a second workpiece support surface disposed substantially vertically.

32. A workpiece support assembly according to claim 31 including means for removeably securing workpieces on said workpiece support surfaces comprising a vacuum system.

33. A workpiece support assembly according to claim 32 wherein each of said workpiece surfaces includes at least one port and said vacuum system includes a vacuum pump operatively connected to said ports.

34. A workpiece support assembly according to claim 32 wherein said workpiece support members comprise members formed of a porous material and said vacuum system includes a vacuum pump operatively connected to said porous members.

35. A workpiece support assembly according to claim 31 wherein said second workpiece support member depends from a lateral side of said first workpiece support member.

36. A workpiece support assembly according to claim 23 including a first workpiece support member having a first workpiece surface disposed substantially horizontally, a second workpiece support member having a second workpiece support surface disposed substantially vertically, depending from a lateral side of said first workpiece support member and a third workpiece support member having a third workpiece surface disposed substantially vertically, depending from a lateral side of said first workpiece support member.

37. A workpiece support assembly according to claim 36 wherein each of said workpiece support surfaces includes at least one port, and said removeably securing means comprises a vacuum system operatively connected to said ports.

* * * * *